Sept. 25, 1951     I. W. COX     2,568,846
METHOD OF CONSTRUCTING ELECTRIC HEATERS Filed May 3, 1948     3 Sheets—Sheet 1

Inventor
Irvin W. Cox
By [signature]
Attorney

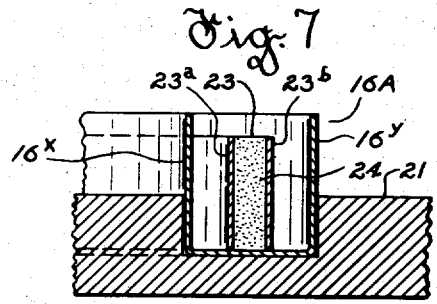
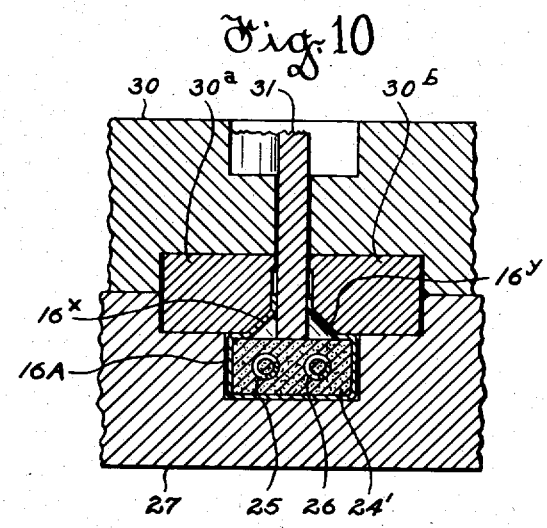
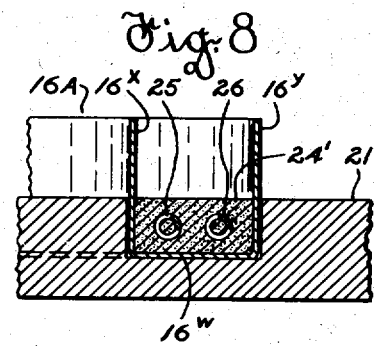
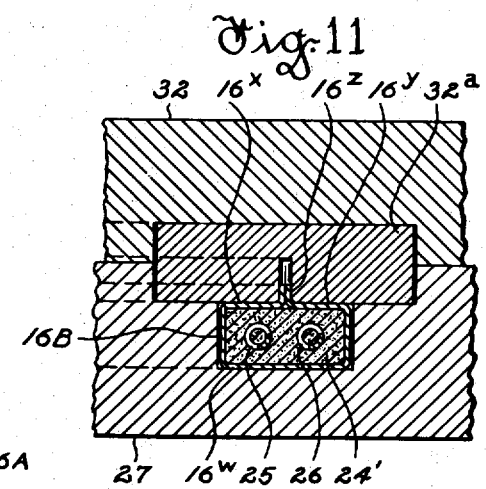
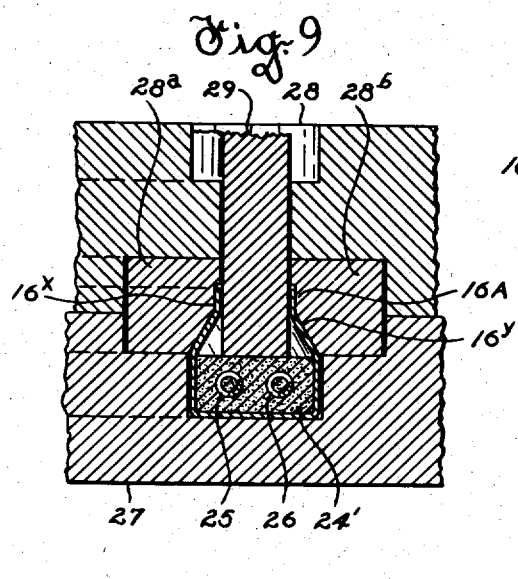

Sept. 25, 1951     I. W. COX     2,568,846
METHOD OF CONSTRUCTING ELECTRIC HEATERS
Filed May 3, 1948     3 Sheets-Sheet 3
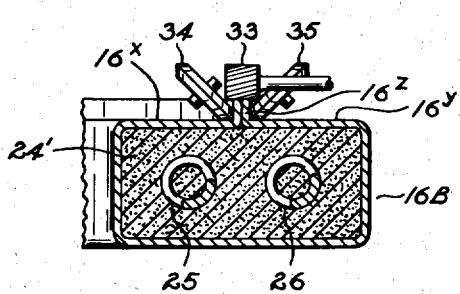
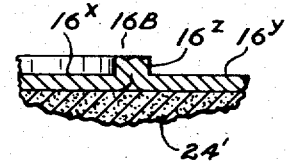
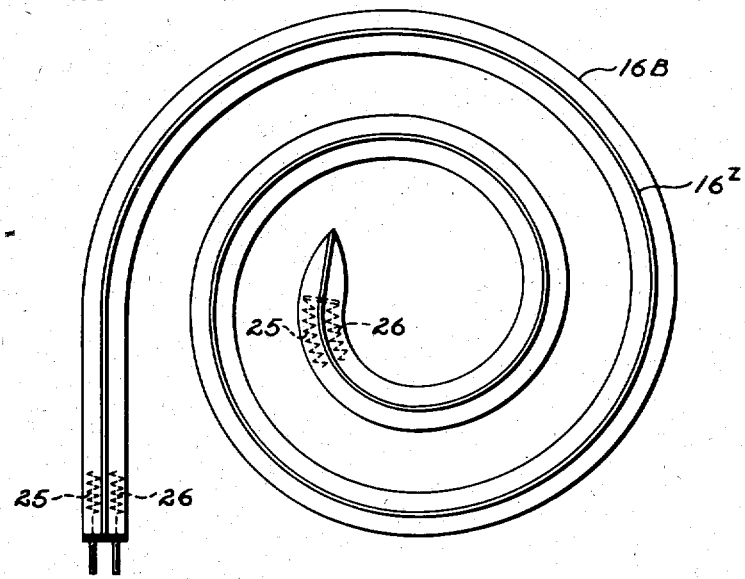
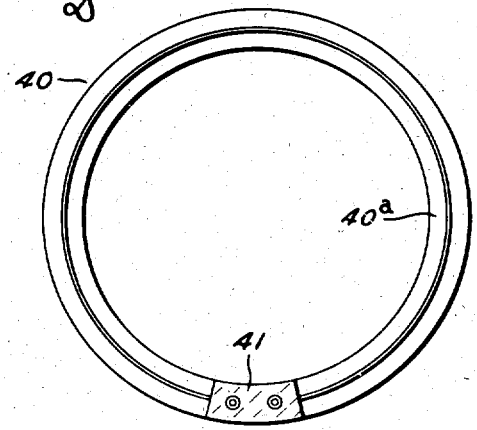
Inventor
Irvin W. Cox
By Frank M. Hubbard
Attorney Patented Sept. 25, 1951

2,568,846

UNITED STATES PATENT OFFICE 2,568,846

METHOD OF CONSTRUCTING ELECTRIC HEATERS

Irvin W. Cox, West Allis, Wis., assignor to Cutler-Hammer, Inc., Milwaukee, Wis., a corporation of Delaware Application May 3, 1948, Serial No. 24,730

10 Claims. (Cl. 201—67)

1

This invention relates to electric heaters and a method of constructing the same.

The invention is particularly applicable to heaters of curvilinear form and especially those of flat spiral form.

Heaters of the character aforestated commonly comprise straight tubular type units bent into the desired curvilinear form, and the present invention has among its objects to produce heaters having the advantageous characteristics of those of the tubular type but avoiding need of employment of bendable tubing and avoiding some of the problems met with in producing satisfactory bendable units.

Other objects and advantages of the present invention will hereinafter appear.

The accompanying drawings exemplify more or less schematically certain of the ways in which the instant method may be carried out, it being understood that the method is not to be regarded as limited by the drawings.

In the drawings,

Figs. 7 and 8 are views in cross section illustrating certain operations performed in conjunction with the channel strip;

Figs. 9 to 11, inclusive, are views in cross section illustrating certain bending operations performed on the channel strip;

Fig. 12 is a view in cross section of the inner end of the sheath in the stage of completion corresponding to Fig. 11;

Figs. 13 and 14 are views in cross section illustrating certain finishing steps performed in the manufacture of a sheathed heating element;

Fig. 15 is a plan view of a completed heater, and

Fig. 16 is a plan view of a completed heater having a different curvilinear form.

Figure 1:
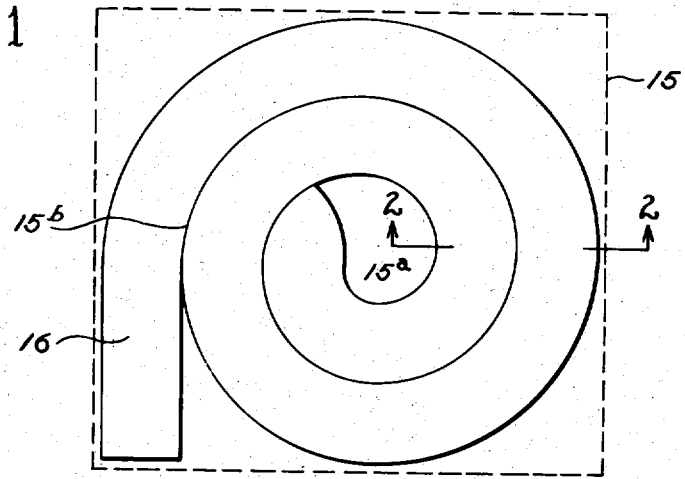
Figure 1 is a plan view of a flat curvilinear metal strip and the flat blank from which it is formed.

Referring to Fig. 1, it shows, in broken lines, a flat metal blank 15 from which a preferred form of flat spiral strip 16, shown in full lines, is obtained by certain punching and shearing operations performed on blank 15. Preferably the blank 15 is composed of a high heat resistant alloy such as "Inconel." Strip 16 is obtained from blank 15 by first placing the latter in a blanking die to effect removal of the centrally located portion 15ª of said blank and also all portions of said blank extending beyond the outer limits of said strip. Then blank 15 is placed in a step type die for production of spiral strip 16 of uniform width except as noted by the progressive shearing of the blank from the inside to the outside along the spiral line 15ᵇ. The innermost coil or turn of strip 16 is preferably tapered at its end as shown in Fig. 1 to facilitate closing and sealing of the inner end of the completed unit in a manner considered desirable, but obviously end closing and sealing may be accomplished in various other ways not requiring end taper of the strip.

The spiral strip 16 thus obtained is then preferably subjected to a straightening operation in a powered press to insure that all portions of the strip will lie substantially in a common plane.

Spiral strip 16 is then subjected to a drawing operation to provide an open spiral channel strip, and here let it be assumed that the strip has no tapered end portion to be considered.

Figure 2:
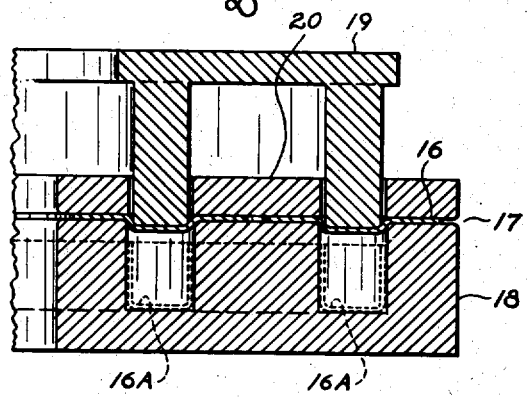
Fig. 2 is a view in cross section of a portion of a draw-die set.

Referring to Fig. 2, it shows in fragmentary cross section a portion of a die set 17 of a known type which may be used to effect the formation of the spiral channel. It will be appreciated that the die set is such that it will provide for formation of a channel cross section concurrently throughout the length of strip 16.

More particularly die set 17 comprises a female die 18 and cooperating male die 19 and a pressure pad 20. Adjacent coils or turns of strip 16, as viewed in cross section on approximately the line 2—2 of Fig. 1, are shown in an intermediate stage of formation by the above mentioned die set into a corresponding spiral channel strip 16A. Such formation is obtained by a straight downward stroke of die 19 with respect to the die 18, the strip 16 being held in position against the latter by the pressure pad 20, in a manner well known in the metal drawing art. When die 19 is moved downwardly into its limit within the die 18 the coil turns will be formed as depicted in broken lines in Fig. 2.

Figure 3:
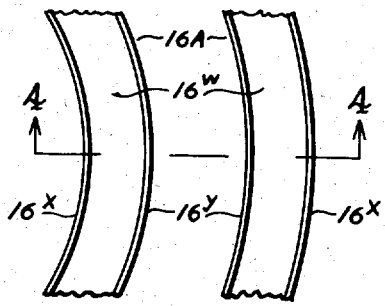
Fig. 3 is a fragmentary plan view of a curvilinear channel strip formed from the strip shown in Fig. 1.
Figure 4:
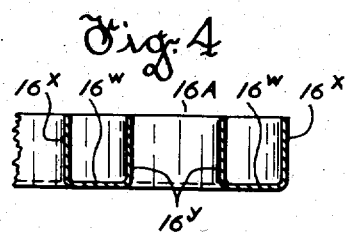
Fig. 4 is a view taken along the line 4—4 of Fig. 3.

Referring to Figs. 3 and 4, they show how a fragment of the finished spiral channel strip 16A will appear in plan and cross section, respectively. It comprises a bottom wall 16ʷ and side walls 16ˣ and 16ʸ which are respectively integrally connected, the side walls projecting at right angles with respect to the wall 16ʷ. The cross sectional form depicted for the adjacent coils or turns in Fig. 4 exists throughout the length of channel strip 16A except as the inner end of the strip may be formed differently for closing and sealing purposes.

Following the aforedescribed drawing operation, channel strip 16A is preferably subjected to annealing treatment in a controlled atmosphere to render it more ductile for further working of the same which will now be described.

Following such annealing treatment channel strip 16A is placed in a jig 21 (Figs. 7 and 8) having a recess of such cross sectional form and longitudinal convolution as to accommodate said channel strip in its entirety; said jig being shown only in fragmentary cross section.

As shown in Fig. 7, a fixture 23 having parallel walls 23ᵃ and 23ᵇ, which are spaced at constant distance from each other and which have a spiral convolution corresponding to the walls 16ˣ and 16ᶻ of strip 16A, is inserted within the latter so that it bottoms on the inner side of the wall 16ʷ. Figure 23 is then filled level throughout its extent with a suitable granular insulating material 24 such as, for example, magnesium oxide. Fixture 23 is then withdrawn from the strip 16A and a deposit of insulating material 24 remains therewithin. The deposit of insulating material is then subjected to a light compacting operation at a pressure of about 10 pounds per square inch uniformly throughout strip 16A, thereby forming a loosely compacted bed of insulating material on the bottom of the later. It will be noted that the effective cross sectional area of the fixture 23 determines the depth of the insulating material 24 deposited within channel strip 16A.

Referring to Fig. 8, a pair of resistors 25 and 26 which are preferably of the helical coil type are then, in any preferred manner, partially inserted within the bed of insulating material 24 in a spaced relation with respect to the walls 16ˣ and 16ʸ and with respect to one another, throughout substantially the length of strip 16A, the inner end portion of said strip extending somewhat beyond said resistors. Adjacent the inner end of the strip the resistors 25 and 26 are terminally interconnected for series relationship and said resistors have their opposite terminals extended outwardly beyond the outer end of strip 16A. It will be understood, of course, that a single continuous resistor may be used instead of the interconnected resistors above specified.

A second filling of insulating material is then introduced into strip 16A in the manner aforedescribed in connection with Fig. 7. This latter fill of insulating material is then subjected to a compressing operation at a pressure of about 100,000 pounds per square inch. As a result a dense, hard mass of insulating material 24' is formed within strip 16A with the resistors 25 and 26 embedded therewithin, as shown in Fig. 8. Also the insulating mass embeds the interconnection of the resistors.

Preparatory to folding the walls 16ˣ and 16ʸ to encase the insulating material 24' and the interconnected resistors 25 and 26 embedded therewithin, strip 16A is placed in a jig 27 which is shown in fragmentary cross section in Figs. 9 to 11, inclusive. The recess formed in jig 27 will, of course, have its cross sectional and longitudinal convolutional form corresponding to the spiral form of strip 16A.

Generally considered Figs. 9 to 11, inclusive, illustrate successive sets of bending dies and the manner in which the walls 16ˣ and 16ʸ are bent or folded to effect a sheath encased heating element by the use of such bending dies. The actual number of such sets and the increments of bending to be accomplished by each will, of course vary according to the wall thicknesses of strip 16A and the cross sectional width of the latter. Thus it will be understood that the steps to be described in connection with Figs. 9 to 11, inclusive, are illustrative only of the preferred manner in which such bending or folding is to be accomplished.

Referring to Fig. 9, it shows in fragmentary cross section a bending die 28 which is provided with a pair of complementary working portions 28ᵃ and 28ᵇ which are positioned in a spaced relation with respect to one another. When die 28 is moved downwardly with a straight stroke into engagement with jig 27 the walls 16ˣ and 16ʸ are bent toward one another by the engagement of the portions 28ᵃ and 28ᵇ of the die 28 therewith. During such operation it is preferred that a member 29 which is centered between the portions 28ᵃ and 28ᵇ of die 28 exert constant pressure downwardly against the upper surface of insulating material 24' to prevent the breaking up or crumbling of the compacted mass of the latter due to the bending of the walls 16ˣ and 16ʸ of strip 16A.

Referring to Fig. 10, is shows an intermediate bending die 30 which is provided with a pair of complementary work portions 30ᵃ and 30ᵇ. Die 30 is also moved downwardly with a straight stroke into engagement with jig 27 to effect further bending of the walls 16ˣ and 16ʸ of strip 16A. A member 31 which is like member 29 aforedescribed, but narrower in width, is used to prevent breakup of the compacted mass of insulating material 24' during the aforementioned operation of the die 30.

Referring to Fig. 11, it shows a bending die 32 which is used to substantially complete the bending and folding of walls 16ˣ and 16ʸ of strip 16A. Die 32 is provided with a grooved working portion 32ᵃ which when said die is moved downwardly with a straight stroke into engagement with jig 27 brings the walls 16ˣ and 16ʸ adjacent their outer edges into an upstanding meeting relation along a bead 16ᶻ and other portions of the walls 16ˣ and 16ʸ are folded against the upper surface of insulating material 24' in substantially parallel alinement with the bottom wall 16ʷ. Thus channel strip 16A is formed into an encasing sheath 16B which completely surrounds the insulating material 24 and the resistors 25 and 26 embedded therewithin.

As depicted in Fig. 13, sheath 16B is then preferably subjected to a milling operation to effect evening and reduction in height of bead 16ᶻ. As will be understood by those skilled in the art, the aforedescribed bending and folding operations are apt to cause the bead 16ˣ to be uneven or irregular. Such milling operation may be effected by progressively passing the bead under an end mill 33 while the meeting portions of the walls 16ˣ and 16ʸ are pressed tightly together by the beveled rollers 34 and 35 which engage opposite sides of said bead below the cutting edge of end mill 33.

To completely close sheath 16B along the extent of its convolution the bead 16ᶻ is subjected to continuous welding from the outer to the inner end of the sheath. Preferably this is done by a continuous arc welding process and the welding apparatus or the sheath can be moved as preferred. Necessarily bead 16ª must be continuously welding to a sufficient depth to insure a moisture-impervious seal for said sheath as illustrated in Fig. 14.

Following the welding of the sheath as aforedescribed it is then preferably placed in a finishing die (not shown) wherein it is subjected to a compressing operation at about 120,000 pounds per square inch throughout its extent. This causes further compacting of the insulating material 24 and intimate contact of said material with the encasing sheath, the ultimate cross sectional form for the heating element being determined thereby.

Figure 5:
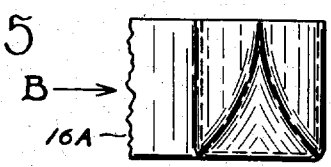
Fig. 5 is a view of the inner end of the channel strip looking in the direction of the arrow A in Fig. 6.
Figure 6:
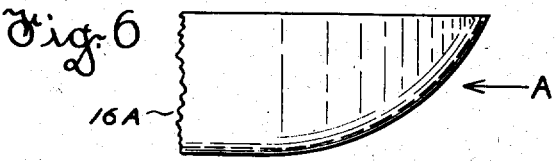
Fig. 6 is a view looking in the direction of the arrow B in Fig. 5.

Considering now closing and sealing of the inner end of the unit it not only is obvious as afore set forth that this can be accomplished in various ways but it is obvious that end closing and sealing may be accomplished as an additional step or as part of the manufacturing process aforedescribed. The aforementioned taper of the inner end of the strip is favored as enabling the strip to be readily folded or bent to produce a neat end closure which may be readily sealed by welding. Thus by proper design of the equipment aforediscussed the tapered end portion of the strip may be formed along with forming of the remainder of the strip, first to take the "prow" shaped form depicted in Figs. 5 and 6. While in this form insulation may be introduced therein and compacted by the apparatus employed for introducing and compacting the insulation in the main part of the strip. Then by the apparatus aforedescribed for final forming of the main portion of the strip the "prow" shaped end portion may have the upper portions of its side walls folded or bent in a like manner, as depicted in Fig. 12. In other words, its upturned edges will form a bead as a continuation of the bead aforedescribed and with proper forming of the "prow" shaped end portion sealing thereof would be effected by welding its bead in the manner aforedescribed.

If a terminal seal is then applied to the outer end of sheath 16B and preferred types of terminal devices are attached to the terminal portions of resistors 25 and 26 a completed sheathed electric heater of spiral convolution will be obtained, as depicted in Fig. 15.

Referring to Fig. 16, it shows an electric heating element 40 of ring or annular form which may be assumed to have a cross sectional form similar to that shown in Fig. 14. Heating element 40 may be constructed in the manner aforedescribed in connection with the spiral form of heater. However, the encasing sheath 40ª of heater 40 is formed to be of a continuous character and it is necessary to cut away a portion of the top or bottom wall of said sheath, remove the insulating material thus exposed and then insert a terminal block 41 together with sealing materials therewithin to provide for making electrical connection to said heater. The number of terminal devices present for making of circuit connections will, of course, vary according to the number and arrangement of resistor elements included within the heater.

As will be understood, the method of constructing sheathed electric heaters as aforedescribed may be adapted to construction of such heaters in various other curvilinear forms. Of course the various jigs and dies used will be constructed in a form corresponding to the ultimate curvilinear form of the heating element to be obtained.

Construction of sheathed electric heaters by the methods aforedescribed is advantageous in several respects. The spacing between the resistor elements and the encasing sheath may be reduced inasmuch as the spaced relation therebetween can be maintained with greater accuracy throughout the extent of the heater. Further, it is feasible to use an encasing sheath of thinner wall thickness and this together with the decreased spacing between the resistors and its walls provides for increased rate of heat transfer to the outer surface of the heater. The use of sheet stock of a high heat resistant alloy to provide an encasing sheath effects a substantial reduction in material costs as contrasted with the use of seamless tubing of the same alloy.

What I claim as new and desire to secure by Letters Patent is:

1. The method of producing a curvilinear heater wherein a resistor embedded in insulation is enclosed in a tightly fitting one-piece sheet metal sheath of tubular character, which comprises the steps of, cutting from a sheet metal blank a flat strip curved lengthwise in a configuration corresponding to the ultimate curvilinear form of the heater, forming said strip throughout its length, through the medium of straight line drawing die elements, into an open channel strip of the desired ultimate curvilinear form, and effecting by a series of bending dies applied in sequence and by movement thereof in a direction normal to the bottom wall of said channel strip folding to a meeting and welding relation throughout the length of the heater portions of the side walls of the channel strip to provide a one-piece sheath.

2. The method of producing a curvilinear heater wherein a resistor embedded in insulation is enclosed in a tightly fitting one-piece sheet metal sheath of tubular character, which comprises the steps of, cutting from a sheet metal blank a flat strip curved lengthwise in a configuration corresponding to the ultimate curvilinear form of the heater, forming said strip throughout its length, through the medium of straight line drawing die elements, into an open channel strip of the desired ultimate curvilinear form, and effecting by a series of bending dies applied in sequence and by movement thereof in a direction normal to the bottom wall of said channel strip simultaneous bending of all portions of the length of the side walls of said channel strip above the insulation into a meeting and welding relation in a series of separate steps to provide a one-piece sheath.

3. The method of producing a curvilinear heater wherein a resistor embedded in insulation is enclosed in a tightly fitting one-piece sheet metal sheath of tubular character, which comprises the steps of, cutting from a sheet metal blank a flat strip curved lengthwise in a configuration corresponding to the ultimate curvilinear form of the heater, forming said strip throughout substantially its entire length, through the medium of straight line drawing die elements, into an open channel strip of rectangular transverse cross section and of the desired ultimate curvilinear form lengthwise, and effecting by a series of bending dies applied in sequence and by movement thereof in a direction normal to the bottom wall of said channel strip simultaneous bending of all portions of the length of the side walls of said channel strip above the insulation into a meeting and welding relation in a series of separate steps to provide a one-piece sheath of rectangular transverse cross section.

4. The method of producing a curvilinear heater wherein a resistor embedded in insulation is enclosed in a tightly fitting one-piece sheet metal sheath of tubular character, which comprises the steps of, cutting from a sheet metal blank a flat strip curved lengthwise in a configuration corresponding to the ultimate curvilinear form of the heater, forming said strip throughout its length, through the medium of straight line drawing die elements, into an open channel strip of the desired ultimate curvilinear form, effecting by a series of bending dies applied in sequence and by movement thereof in a direction normal to the bottom wall of said channel strip simultaneous bending of all portions of the length of the side walls of said channel strip above the insulation into a meeting and welding relation to produce a one-piece sheath, and welding the meeting portion of the side walls throughout the length of the heater to provide a seal for said sheath.

5. The method of producing a curvilinear heater wherein a resistor embedded in insulation is enclosed in a tightly fitting one-piece sheet metal sheath of tubular character, which comprises the steps of, cutting from a sheet metal blank a flat strip curved lengthwise in a configuration corresponding to the ultimate curvilinear form of the heater, forming said strip throughout substantially its entire length, through the medium of straight line drawing die elements, into an open channel strip of rectangular transverse cross section and of the desired ultimate curvilinear form lengthwise, and effecting by a series of bending dies applied in sequence and by movement thereof in a direction normal to the bottom wall of said channel strip simultaneous bending of all portions of the length of the side walls of said channel strip above the insulation into a meeting and welding relation in a series of separate steps to provide a one-piece sheath of rectangular transverse cross section, and welding meeting portions of said side walls throughout the length of the heater to provide a seal for said sheath.

6. The method of producing a curvilinear heater wherein a resistor embedded in insulation is enclosed in a tightly fitting one-piece sheet metal sheath of tubular character, which comprises the steps of, cutting from a sheet metal blank a flat strip curved lengthwise in a configuration corresponding to the ultimate curvilinear form of the heater, forming said strip throughout its length, through the medium of straight line drawing die elements, into an open channel strip of the desired ultimate curvilinear form, depositing a quantity of granular insulating material in the open side of said channel strip to form a partial fill of said material throughout the length of said channel strip, partially compacting said fill of material, inserting a resistor in said channel strip and then partly embedding the same in said fill of material in a spaced relation with respect to the walls of said channel strip, depositing an additional quantity of insulating material throughout the length of said channel strip, compacting said insulating material into a dense hard mass around and about said resistor, effecting by a series of bending dies applied sequentially and by movement thereof in a direction normal to the bottom wall of said channel strip simultaneous bending of all portions of the length of said walls of said channel strip above said insulating material into a meeting and welding relation in a series of separate forming steps while exerting, during all but the last such step, pressure on said insulating material to prevent its displacement, and welding meeting portions of said side walls throughout the length of the heater to provide a seal for said sheath.

7. The method of producing a spiral heater wherein a resistor embedded in insulation is enclosed in a tightly fitting one-piece sheet metal sheath of tubular character, which comprises the steps of, cutting from a sheet metal blank a flat strip curved spirally lengthwise corresponding to the ultimate spiral form of the heater, forming said strip substantially throughout its length, through the medium of straight line drawing die elements, into an open channel strip of the desired ultimate spiral form, depositing a quantity of granular insulating material in the open side of said channel strip to form a partial fill of said material throughout the length of said channel strip, partially compacting said fill of material, inserting a resistor in said channel and then partially embedding the same in said fill of material in a spaced relation with respect to the walls of said channel strip, depositing an additional quantity of insulating material throughout the length of said channel strip, compacting said insulating material into a dense hard mass around and about said resistor, effecting by a series of bending dies applied in sequence and by movement thereof in a direction normal to the bottom wall of said channel strip simultaneous bending of all portions of the length of the side walls of said channel strip above said insulating material into a meeting and welding relation in a series of steps while exerting, during all but the last such step, pressure on said insulating material to prevent its displacement, and welding the meeting portions of said walls to provide a seal for said sheath.

8. The method of producing an annular heater wherein a resistor embedded in insulation is enclosed in a tightly fitting one-piece sheet metal sheath of tubular character, which comprises the steps of, cutting from a sheet metal blank a flat annular strip, forming said strip into an open channel strip of the desired ultimate annular form through the medium of straight line drawing die elements, depositing a quantity of granular insulating material in the open side of said channel strip to form a partial fill of said material throughout the length of said channel strip, partially compacting said fill of material, inserting a resistor in said channel and then partly embedding the same in said fill of material in a spaced relation with respect to the walls of said channel strip, depositing an additional quantity of insulating material throughout the length of said channel strip, compacting said insulating material into a dense hard mass around and about said resistor, effecting by a series of bending dies applied in sequence and by movement thereof in a direction normal to the bottom wall of said channel strip simultaneous bending of all portions of the length of the side walls of said channel strip above said insulating material into a meeting and welding relation in a series of steps while exerting, during all but the last such step, pressure on said insulating material to prevent its displacement, and welding the meeting portions of said walls to provide a seal for said sheath.

9. An electric heater comprising a metal sheath curved lengthwise in a manner such that the longitudinal axis thereof lies in one plane and throughout substantially all of its length being of rectangular transverse cross section, said sheath having a closed prow-shaped end and being welded throughout its length on one side to form a one-piece tube, two helical resistor elements within said sheath correspondingly curved and extending lengthwise thereof, said resistors being electrically connected to each other adjacent said prow-shaped end and each having a terminal portion extending from the other end of said sheath, and a hard dense mass of insulating material confined in said sheath within which said resistors are embedded in spaced apart relation throughout their length from each other and from said sheath.

10. An electric heater comprising a metal sheath curved lengthwise in a flat spiral and throughout substantially all of its length being of rectangular transverse cross section, said sheath terminating at a closed prow-shaped inner end and being welded throughout its length on one side to form a one-piece tube, two helical resistor elements within said sheath correspondingly curved and extending lengthwise thereof, said resistors being electrically connected to each other adjacent said prow-shaped inner end and each having a terminal portion extending from the outer end of said sheath, and a hard dense mass of insulating material confined in said sheath within which said resistors are embedded in spaced apart relation throughout their length from each other and from said sheath.

IRVIN W. COX.

REFERENCES CITED

The following references are of record in the file of this patent:

UNITED STATES PATENTS

| Number | Name | Date |
| --- | --- | --- |
| 1,973,629 | Hofer | Sept. 11, 1934 |
| 2,139,785 | Wiegand | Dec. 13, 1938 |
| 2,243,823 | Backer | May 27, 1941 |
| 2,302,808 | Smith | Nov. 24, 1942 |
| 2,323,089 | Horsfield | June 29, 1943 |
| 2,456,343 | Tuttle | Dec. 14, 1949 |

Certificate of Correction

Patent No. 2,568,846 September 25, 1951

IRVIN W. COX

It is hereby certified that error appears in the printed specification of the above numbered patent requiring correction as follows:

Column 3, line 26, for "Figure" read *Fixture*; line 36, for "later" read *latter*; column 4, line 32, for "is shows" read *it shows*; column 5, line 4, for "welding" read *welded*; column 8, line 3, strike out "forming";

and that the said Letters Patent should be read as corrected above, so that the same may conform to the record of the case in the Patent Office.

Signed and sealed this 19th day of February, A. D. 1952.

[SEAL]

THOMAS F. MURPHY,
*Assistant Commissioner of Patents.*